United States Patent [19]

Domesle et al.

[11] Patent Number: 5,516,494
[45] Date of Patent: May 14, 1996

[54] PROCESS FOR APPLYING A COATING TO HONEYCOMB STRUCTURES IN AN EXHAUST GAS CONVERTER

[75] Inventors: Rainer Domesle, Alzenau, Germany; Bernd Engler, White Plains, N.Y.; Egbert Lox, Hanau, Germany

[73] Assignee: Degussa Aktiengesellschaft, Frankfurt am Main, Germany

[21] Appl. No.: 405,097

[22] Filed: Mar. 16, 1995

[30] Foreign Application Priority Data

Mar. 17, 1994 [DE] Germany ............ 44 09 142.7

[51] Int. Cl.⁶ .................................................. B05D 5/00
[52] U.S. Cl. ................ 427/243; 427/379; 427/385.5; 502/439; 502/527
[58] Field of Search ................... 427/243, 379, 427/385.5; 502/439, 527

[56] References Cited

U.S. PATENT DOCUMENTS

| | | | |
|---|---|---|---|
| 4,066,801 | 1/1928 | Hoyer et al. | 427/294 X |
| 4,289,810 | 9/1981 | Eng et al. | 427/230 |
| 4,550,034 | 10/1985 | Shimrock et al. | 427/243 |
| 5,113,653 | 5/1992 | Usui et al. | 60/299 |
| 5,139,993 | 8/1992 | Schmidt et al. | 502/439 X |

FOREIGN PATENT DOCUMENTS

| | | |
|---|---|---|
| 0202733 | 11/1986 | European Pat. Off. . |
| 202733 | 11/1986 | European Pat. Off. . |
| 0220468 | 5/1987 | European Pat. Off. . |
| 0245736 | 11/1987 | European Pat. Off. . |
| 0484364 | 9/1993 | European Pat. Off. . |
| 8914916.5 | 4/1990 | Germany . |
| 4040150 | 8/1991 | Germany . |
| 4024942 | 2/1992 | Germany . |
| 89/10470 | 11/1989 | WIPO . |

*Primary Examiner*—Michael Lusignan
*Attorney, Agent, or Firm*—Beveridge, DeGrandi, Weilacher & Young

[57] ABSTRACT

A process for applying a coating to honeycomb structures in an exhaust gas converter which contains two such honeycomb structures in a common housing or enveloping tube which are arranged one after the other and which are separated from each other by a gap. The coating dispersion is first supplied from one end of the exhaust gas converter up to the gap between the two honeycomb structures. Then excess coating dispersion is driven out using a blast of air from the direction of the uncoated honeycomb structure. To coat the second honeycomb structure, the exhaust gas converter is inverted and the coating dispersion is then applied in the same way but from the uncoated end. Following the dispersion coating procedure, production of the catalyst is completed by drying and optionally calcining.

11 Claims, No Drawings

PROCESS FOR APPLYING A COATING TO HONEYCOMB STRUCTURES IN AN EXHAUST GAS CONVERTER

INTRODUCTION AND BACKGROUND

The present invention relates to a process for applying a coating to honeycomb structures in an exhaust gas converter which contains two such honeycomb structures in a common housing or enveloping tube, which are arranged one after the other and are separated from each other by a gap. The coating may be a catalytically active coating, an absorbing or adsorbing coating or a combination of these types of coating in an exhaust gas converter, which is deposited onto the honeycomb structure by using a coating dispersion of finely divided solids and optionally dissolved compounds.

More particularly, the present invention enables the coating of a plurality of separate honeycomb structures after being installed in a common housing thereby eliminating the need to apply dispersion coatings to honeycombs prior to their being positioned in the catalytic converter housing.

The vast majority of catalysts for purifying exhaust gases from, for example, stationary and non-stationary internal combustion engines, in order to convert them to harmless components are produced by first coating inert solid monolithic carriers with a catalytically active coating. After coating with the catalysts, the carriers are inserted into a housing or converter canister which has inlet and outlet openings for the ingress and egress of exhaust gases. Together with the housing, the catalysts form so-called exhaust gas converters. In the simplest case, the housing may consist of a single enveloping tube.

Solid inert carriers in this art, generally termed "monoliths", may comprise honeycomb structures made from a wide variety of ceramic materials the most common of which are cordierite and mullite or from heat-resistant metallic alloys with the main constituents chromium, aluminum and iron, or chromium, aluminum, iron and nickel. The honeycomb monolith has a cellular structure with parallel flow channels through which the exhaust gas can flow without a substantial loss of pressure due to the exhaust gas converter.

Ceramic honeycomb structures are generally obtained by the continuous extrusion of ceramic materials followed by drying and calcination. The cellular structure (square, triangular, etc.), cell wall thickness and cell density in the honeycomb structure can be freely selected according to each purpose and convenience as is known in the art. As a result of manufacturing tolerances (e.g. deformation by bending), however, this type of ceramic honeycomb structure is only available in restricted lengths.

Metallic honeycomb structures generally consist of a comparatively thin, shaped strip of metal foil of restricted width which stretches continuously from one end of the honeycomb structure to the other, which is housed in a tubular jacket mostly projecting to the outside and connected to this using an appropriate joining procedure. The metallic honeycomb structure itself is produced by methods of fabrication such as rolling up, folding or stacking one or more strips of metal foil, optionally interlaced with at least one length of sheet metal. The strip of metal foil may consist of smooth and/or corrugated, or similarly shaped foil, which for its part may have punched slots or openings of any type so that a shaped structure is formed which is permeable to gas in at least the direction of flow of the exhaust gas. Corresponding metallic honeycomb structures are described in, for example, EP-A 0 220 468, EP-A 0 245 736, DE-A 40 24 942, EP-A 0 484 364 and WO 89/10470.

Since the honeycomb structure and thus the final catalysts are only available in restricted lengths, two separate catalysts are frequently arranged one after the other in an exhaust gas converter housing. Other reasons for arranging catalysts in a sequence in the housing are, for instance, the use of carriers with different cell densities to minimize the pressure loss or to improve mixing of the exhaust gas after partial conversion of the pollutants in the first catalyst. Improved exhaust gas purification values may be produced by fresh mixing of the exhaust gas before it enters the second catalyst.

To reduce hydrocarbon emissions during a cold start, two honeycombs may also be combined in one exhaust gas converter housing, one of which is provided with a hydrocarbon adsorbing coating and the second being provided with a catalytically active coating.

In the case of ceramic catalysts, individual honeycomb structures, mostly with the same cross-section, are inserted at a specific distance from each other in the exhaust gas converter housing which is then sealed at the sides by welding. In the case of metallic catalysts with at least one enveloping tube which projects beyond the honeycomb structure on one side, the enveloping tubes for two honeycomb structures may also be directly welded to each other end-to-end to build up the exhaust gas converter housing. Mixed systems made from ceramic and metallic catalysts are also known.

In the case of known exhaust gas converters, the catalysts are produced by coating the inert honeycomb structures with a catalytically active coating before building them into the converter housing. To do this, the honeycomb structures are typically immersed in an aqueous coating dispersion of metal oxides with a high surface area such as, for example, γ-aluminum oxide and cerium oxide optionally with other additives as promoters in the form of solids or dissolved compounds. After immersion, the flow channels in the honeycomb structure are freed of excess coating dispersion by blowing through with compressed air, dried and calcined. Such dispersion and immersion techniques are widely used in the art. They are used to form coatings on carriers and are generally referred to as "wash coats".

The catalytically active components, mostly noble metals in the platinum group and/or promoters, may be added to the coating dispersion before coating the honeycomb structure or incorporated into the coating after calcining the wash coat, by impregnating the honeycomb with aqueous solutions of soluble compounds of these noble metal and promoter components.

As an alternative to immersion, the honeycomb structure may also be coated with the coating dispersion by pumping it in, absorbing it or pouring it through the structure.

Thus, typical exhaust gas catalysts are a composite structure of inert carrier, coated with a wash coat and a noble metal.

For manufacturing simplicity and for cost-saving purposes, it is desirable, especially in the case of metal catalysts and the increasingly being used, externally heatable, catalysts in series with catalysts, to coat the two honeycomb structures in an exhaust gas converter consisting of two honeycomb structures only after incorporation in the converter housing. However, simply transferring the coating process for separate honeycomb structures to the finally produced and assembled exhaust gas converter is not really satisfactory because the turbulent current of air which is formed between the two honeycomb structures during the blowing out procedure can only inadequately remove the coating dispersion from the internal end faces of the two honeycomb structures and thus channel narrowing or even channel blockages can occur.

Thus, an object of the present invention is to improve coating processes for two honeycomb structures incorporated into one exhaust gas converter whereby the honeycomb structure can be coated to achieve the same quality results as would have been possible by separately coating the honeycomb structures before incorporating them into the converter housing.

SUMMARY OF THE INVENTION

The above and other objects of the invention are achieved by a process for applying a coating of an aqueous dispersion of, for example, a refractory metal oxide, to the honeycomb structure in an exhaust gas converter which contains a first and a second honeycomb structure in a common housing or enveloping tube.

In carrying out the invention the two honeycomb structures, each in an uncoated condition, are arranged one after the other inside of the converter housing and are separated from each other by a gap. The exhaust gas converter housing itself has inlet and outlet openings for the exhaust gases being converted.

A feature of the process of the invention is to first coat one of the honeycomb structures, and then the other, in a sequential manner. This can be done by coating the first honeycomb seen from the upstream side of the catalytic converter by filling the exhaust gas converter with the aqueous coating dispersion via the inlet opening up to the gap between the two honeycomb structures. Then the converter is permitted to empty excess liquid content. Any residual excess dispersion is then removed by means of at least one stream of gas being introduced through the outlet and/or inlet opening. To coat the second honeycomb structure, this coating process is basically repeated by exchanging the inlet and outlet openings. Subsequently, the coating is finally fixed to the honeycomb structure by drying and optionally calcining.

DETAILED DESCRIPTION OF INVENTION

The coating process according to the invention is suitable for coating a plurality, generally two, ceramic and/or metallic honeycomb structures of any length, cell structure or cell density and any cross-section which are located in a common housing or enveloping tube. As used herein, the term "housing" is intended to include a generic definition of housing configurations such as an enveloping tube or canister and the like. The two honeycomb structures may have different cell structures, cell densities and cross-sections and be the same length or different lengths. They may also be fabricated from different materials; e.g. one ceramic and one metallic.

The process may also be used for solid structures with an open-celled pore structure such as, for instance, foamed ceramics. The expression "honeycomb structure" is therefore used herein, in this description and in the Claims, to represent all conventional solid carrier structures used in exhaust gas catalysis.

Ceramic honeycomb structures, before being built into the converter housing, are first encased with a flexible heat-resistant fibre matting in order to avoid damage during the insertion procedure itself or due to vibrations when actually being used. Metallic honeycomb structures may also be built into the converter housing in the same way. Combinations of a metallic and a ceramic honeycomb structure in a common housing such as for instance a metallic, externally heatable, catalyst support and a ceramic honeycomb structure, may also be coated according to the invention.

The coating process according to the invention is particularly useful for metallic honeycomb structures which are fixed in a common enveloping tube, e.g. by soldering. The metallic honeycomb structures may generally be constructed from strips of metal foil as described in the introduction or they may be produced by extruding metal powders and subsequent sintering. Optionally, to increase the mechanical stability, for instance if one of the two honeycomb structures is specified as being particularly short, rod-shaped connectors may be mounted between the two honeycomb structures.

The metallic or ceramic honeycomb structures are conventionally cylindrical or disc-shaped structures of any cross-section. Honeycomb structures which are conical or dome-shaped on one or both sides, however, and cylinders shaped into hollow cones and cylinders with bulges on the front faces may also be used. The gap between the two honeycomb is not of a critical dimension. The minimum gap width is approximately 1 mm. The maximum gap width is in principle not limited but a value equal to the diameter of the honeycomb is reasonable. Depending on the size of the housing and catalysts and the like the size gap can vary.

Honeycomb structures of all types may be built into the exhaust gas converter housing one after the other, combined in the same direction or in opposite directions, in order to ensure a specific, generally uniform distribution of gas in the catalysts. Both conventional cylindrical honeycomb structures and the special shapes and combinations thereof may be coated using the process according to the invention after being built into the converter housing.

The coating process may be used in different types of converter housings and enveloping tubes. Normally, an exhaust gas converter consists of a housing in the shape of a cylindrical tube, which can be provided with flanges and tapers, for instance, for better mounting of the honeycomb structure or to improve the acoustic properties. However, designs with at least one molded or welded cone section can also be coated by the process, wherein the housing or enveloping tube may be built up from two half-shells. Optionally, one or both honeycomb structures may be placed in the cones. The converter may also have a device in the gap between the two honeycomb structures for introducing or removing a gas or a liquid or arrangements may be provided for this purpose.

Coating dispersions which may be used are all known coating dispersions which are prepared by mixing finely divided substances with liquids or by additional wet-milling. Coating dispersions for exhaust gas purification generally contain mostly support materials with high surface areas such as $\gamma$-aluminum oxide, titanium oxide, silicon dioxide and zeolites. Refractory metal oxides are known for this purpose. Promoters may also be included such as cerium oxide, zirconium oxide and molybdenum silicide as well as other auxiliary substances or precursor compounds such as boehmite, cerium acetate or cerium hydroxide and optionally catalytically active components. The catalytically active components may be noble metals from the platinum group and their compounds and/or base metals in the form, for instance, of their oxides, mixed oxides or specific compounds such as perovskite. The present invention is broadly applicable to this area of technology and is not limited to particular chemical formulations.

The liquid phase for the coating dispersion used is generally water or aqueous salt solutions, but any other liquids such as organic solvents and mixtures thereof such as, for instance, an alcohol/water mixture may be used.

According to the invention, the two honeycomb structures in the exhaust gas converter housing are coated one after the other in two steps. To do this, the exhaust gas converter housing is first flooded with coating dispersion through one of its two main openings, e.g. the inlet opening, up to the gap between the two honeycomb structures. The exhaust gas converter housing can be flooded by appropriate immersion of the entire converter in the coating dispersion or by sucking up or pumping the coating dispersion into the exhaust gas converter. Afterwards, the exhaust gas converter housing is emptied of liquid again, which is performed by allowing the coating dispersion to run out or by pumping out the coating dispersion. Finally any excess coating material located in the flow channels is removed by means of at least one stream of gas introduced through the outlet and/or inlet opening. This type of gas stream can be produced by applying an excess or reduced pressure. Normally this process is effected by blowing out with compressed air or by applying suction to draw air through the housing.

For simplicity, emptying the exhaust gas converter and removing the excess coating dispersion may be performed simultaneously in one working process.

The excess coating dispersion is preferably removed by a gas stream such as compressed air which is directed so that emptying takes place through the opening in the exhaust gas converter adjacent to the just freshly coated honeycomb structure. This preferred direction for the flow of gas ensures that the coating dispersion does not reach the yet uncoated honeycomb structure in an uncontrolled manner, which might cause some of the coating to dry out onto some parts of the yet-to-be coated second honeycomb and cause problems during the subsequent coating process. At the same time, an accumulation of coating on the freshly coated honeycomb structure in the region of the gap between the two honeycomb structures, where it is not really possible to check the quality of the coating, is avoided.

If similar accumulations of material should occur on the external front face of the just freshly coated honeycomb structure, this is simple to detect and can be eliminated by a brief suction procedure or by cautious blowing operation by reversing the direction of the gas flow.

To coat the second honeycomb structure, the exhaust gas converter housing is inverted and the coating dispersion is now applied from the still uncoated end. Excess coating dispersion is removed in the same way as in the preceding coating step.

The amount of coating dispersion remaining on the honeycomb structures or the thickness of coating can be affected by adjusting the viscosity of the coating dispersion and by selecting the filling time, the emptying time and the duration and strength of the gas stream used to remove excess dispersion. These measures for controlling the coating thickness are described, for instance, in DE-PS 40 40 150 C2 corresponding to U.S. Pat. No. 5,165,970 (incorporated herein by reference) for coating individual honeycomb structures which are not built-in and may be transferred by analogy to the process according to the invention.

By performing the coating procedures for the two honeycomb structures one after the other according to the invention, disadvantages which would have been produced during simultaneous coating of the two honeycomb structures in the exhaust gas converter may be avoided. With simultaneous coating, the excess coating dispersion can be only inadequately removed from the two internal end faces of the honeycomb structures. This applies in particular to coating dispersions which have a high solids content and thus a high viscosity. This type of highly concentrated coating dispersion is needed when the required layer thickness is intended to be applied in a single coating step. Inadequate removal of the dispersion in this case would be associated with channel narrowing or sometimes channel blockages at or in the vicinity of at least one of the two internal end faces of the honeycomb structure. This would lead to increased exhaust gas pressure in the exhaust gas converter and thus to an undesirable loss of performance of the engine and to excess consumption of fuel. These disadvantages are avoided by the coating process according to the invention.

Following the dispersion coating procedure, there is a drying and optionally a calcination process, for instance in a gas stream which contains hydrogen. Such procedures are well understood in the art.

Generally the coating dispersion already contains all the components for the catalyst formulation as such or in the form of their precursor compounds so that catalyst production is completed at the latest after the final calcination process.

In a special version of the process according to the invention, following the coating procedure, one or both honeycomb structures are impregnated with identical or different solutions of further catalytically active substances such as noble metal salts and/or promoters.

This impregnation is achieved either by pouring, spraying or immersion or optionally by an impregnation process of the same kind as the coating process.

Optionally, it may be advantageous at least partially to fix the dispersion to the first coated honeycomb structure by drying before coating the second honeycomb structure. In the case of dispersions with a tendency to run, this avoids disadvantageous effects on the distribution of the coating when removing excess coating dispersion from the second honeycomb structure. Suitable drying measures which may be used are warming the actual gas stream which is used to remove the excess coating dispersion or subsequently to pass an additional heated gas stream through the exhaust gas converter. There is also the possibility of heating the entire exhaust gas converter before or after coating in order to achieve accelerated drying of the coating.

Due to the stepwise process for coating the two honeycomb structures in accordance with the invention, they may be supplied with different coating dispersions. In this way it is possible to produce catalysts which act in different ways in a single exhaust gas converter. Likewise, one of the two honeycomb structures may be coated with an absorber coating, e.g. for bonding catalyst poisons, and/or an adsorber coating, e.g. for hydrocarbons, while the second honeycomb structure is supplied with a conventional catalyst coating. Likewise, both honeycomb structures may be coated with an absorber or adsorber coating.

In addition, the process according to the invention enables the application of different amounts of coating to the two honeycomb structures, in the event of corresponding catalytic requirements. This can be achieved by using the same composition of dispersion, e.g. by altering the rheological properties of the dispersion between the first and the second coating process. If the coating dispersions have different compositions different amounts of catalytic coating are generally produced on the two honeycomb structures from the start due to the different rheologies.

If one of the two honeycomb structures in the exhaust gas converter is designed only as a flow distributer, flow interrupter or as a externally heatable catalyst support, then this honeycomb structure does not need to be coated. In the case of highly abrasive exhaust gas and extreme thermal stress, it may be advantageous not to coat the honeycomb structure on the inflowing side of the exhaust gas converter.

In the coating process according to the invention, it is important accurately to set the depth when flooding the exhaust gas converter with coating dispersion. To do this, optical methods for checking the level, for instance, may be used. Alternatively, the depth reached may also be adjusted by corresponding volumetric measurements of the amount of coating, e.g. using the number of piston strokes in a pump. This is a matter that can be routinely determined by a person skilled in the art.

Exhaust gas converters coated according to the invention may be used for purifying the exhaust gas from in particular stationary or non-stationary internal combustion engines.

Further variations and modifications of the foregoing will be apparent to those skilled in the art to which this pertains and are intended to be encompassed by the claims appended hereto.

German priority application P 44 09 142.7 is relied on and incorporated herein by reference.

We claim:

1. A process for applying a coating of finely divided solids onto a honeycomb structure in an exhaust gas converter for converting exhaust gas into harmless components comprising introducing into said converter which contains a first and a second honeycomb structure in a common housing a liquid which is a coating solution and/or a coating dispersion of finely divided solids, said honeycombs being arranged one after the other in said housing and being separated from each other by a gap, wherein the exhaust gas converter housing has an inlet and outlet opening for the ingress and egress of exhaust gases being converted into harmless components, coating a first honeycomb structure, in said converter housing by filling said housing with said liquid at least up to the gap between the two honeycomb structures, removing any excess liquid by means of at least one stream of gas being introduced through the outlet and/or inlet opening, and fixing the coating to the honeycomb structure by drying and optionally calcining.

2. A process for applying a coating of finely divided solids onto a honeycomb structure in an exhaust gas converter for converting exhaust gas into harmless components comprising introducing into said converter which contains a first and a second honeycomb structure in a common housing a liquid which is a coating solution or coating dispersion of finely divided solids, said honeycombs being arranged one after the other in said housing and being separated from each other by a gap, wherein the exhaust gas converter housing has an inlet and outlet opening for the ingress and egress of exhaust gases being converted into harmless components, coating a first honeycomb structure, in said converter housing by filling said housing from one end thereof with said liquid at least up to the gap between the two honeycomb structures, removing any excess liquid by means of at least one stream of gas being introduced through the outlet and/or inlet opening, then coating the second honeycomb structure, by filling the housing from the opposite end thereof with said liquid at least up to the gap between the two honeycomb structure, removing any excess liquid by means of at least one stream of gas being introduced through the outlet and/or inlet opening, and fixing the coating to the honeycomb structure by drying and optionally calcining.

3. A process according to claim 2, wherein the exhaust gas converter is emptied and any excess liquid is removed simultaneously.

4. A process according to claim 2, wherein the coating on the first honeycomb structure is fixed by at least partially drying before coating the second honeycomb structure.

5. A process according to claim 4 wherein said drying is by heating the actual gas stream used to remove excess coating dispersion.

6. A process according to claim 4 further comprising subsequently passing an additional, heated gas stream through the exhaust gas converter or by heating the converter before or after the coating procedure.

7. A process according to claim 2, wherein the two honeycomb structures are each coated with a different liquids.

8. A process according to claim 2 wherein the two honeycomb structures are each coated with a different amount liquid.

9. A process according to claim 2 further comprising after fixing the coating by drying and optionally calcining, at least one catalytically active component and/or at least one promoter is introduced by impregnating the coating on at least one honeycomb structure.

10. A process according to claim 2 further comprising after drying and optionally calcining, the coatings on the two honeycomb structures are impregnated with different catalytically active components and/or promoters.

11. A process according to claim 9 when the coatings are impregnated in the same way as the honeycomb structures are coated.

* * * * *